United States Patent
Ishizuka (10) Patent No.: US 8,960,247 B2
(45) Date of Patent: Feb. 24, 2015

(54) PNEUMATIC TIRE

(75) Inventor: Katsuyoshi Ishizuka, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1015 days.

(21) Appl. No.: 12/529,846

(22) PCT Filed: Mar. 4, 2008

(86) PCT No.: PCT/JP2008/053865
§ 371 (c)(1),
(2), (4) Date: Sep. 3, 2009

(87) PCT Pub. No.: WO2008/108370
PCT Pub. Date: Sep. 12, 2008

(65) Prior Publication Data
US 2010/0024937 A1    Feb. 4, 2010

(30) Foreign Application Priority Data
Mar. 5, 2007    (JP) .................. 2007-054483

(51) Int. Cl.
| | |
|---|---|
| B60C 11/00 | (2006.01) |
| B60C 1/00 | (2006.01) |
| C08K 3/00 | (2006.01) |
| C08L 7/00 | (2006.01) |
| C08L 9/00 | (2006.01) |
| C08K 3/04 | (2006.01) |
| C08K 3/36 | (2006.01) |
| C08K 5/25 | (2006.01) |
| C08K 5/548 | (2006.01) |

(52) U.S. Cl.
CPC ............ B60C 1/0016 (2013.04); C08K 3/0033 (2013.01); C08L 7/00 (2013.01); C08L 9/00 (2013.01); B60C 11/005 (2013.01); C08K 3/04 (2013.01); C08K 3/36 (2013.01); C08K 5/25 (2013.01); C08K 5/548 (2013.01); B60C 2011/0025 (2013.04)
USPC ......................................................... 152/209.5

(58) Field of Classification Search
USPC ....................................................... 152/209.5
See application file for complete search history.

(56) References Cited

U.S. PATENT DOCUMENTS

| | | | |
|---|---|---|---|
| 2003/0079816 A1 * | 5/2003 | Mizuno ...................... | 152/209.5 |
| 2007/0010610 A1 * | 1/2007 | Kondo ......................... | 524/493 |

FOREIGN PATENT DOCUMENTS

| | | | |
|---|---|---|---|
| EP | 738613 A1 * | 10/1996 | |
| EP | 1435375 A1 | 7/2004 | |

(Continued)

OTHER PUBLICATIONS

Machine translation for Japan 2004-231693 (no date).*

(Continued)

*Primary Examiner* — Steven D Maki
(74) *Attorney, Agent, or Firm* — Sughrue Mion, PLLC (57) ABSTRACT

This invention relates to a pneumatic tire in which an appearance during a final stage of running is good and a heat buildup is low, and more particularly to a pneumatic tire comprising a tread portion (3) having a cap rubber (8) and a base rubber (7), characterized in that a rubber composition comprising not less than 30 parts by mass of carbon black and not less than 2 parts by mass of silica based on 100 parts by mass of a rubber component is used in the base rubber (7), and the base rubber (7) has a tensile stress at 300% elongation ($M_{300}$) of 10-14 MPa and a loss tangent (tan δ) of 0.1 or lower.

7 Claims, 1 Drawing Sheet

(56) References Cited

FOREIGN PATENT DOCUMENTS

| | | | | |
|---|---|---|---|---|
| JP | 8-27315 | A | | 1/1996 |
| JP | 10-095204 | A | * | 4/1998 |
| JP | 10-095204 | A | | 4/1998 |
| JP | 11-059124 | A | | 3/1999 |
| JP | 11-165502 | A | * | 6/1999 |
| JP | 2001-213112 | A | | 8/2001 |
| JP | 2004-196858 | A | | 7/2004 |
| JP | 2004-231693 | A | * | 8/2004 |
| JP | 2005-015691 | A | | 1/2005 |
| JP | 2005-15691 | A | | 1/2005 |
| JP | 2005-082766 | A | | 3/2005 |
| JP | 2007-031522 | A | | 2/2007 |
| JP | 2007-308609 | A | * | 11/2007 |

OTHER PUBLICATIONS

Machine translation for Japan 11-165502 (no date).*
Machine translation for Japan 10-095,204 (no date).*
Machine translation for Japan 2007-308609 (no date).*
Office Action issued Jul. 8, 2011, in corresponding European Patent Application No. 08721285.8.
Communication from the European Patent Office, dated May 10, 2012, in corresponding European Patent Application No. 08 721 285.8-2109.
Notification of Reasons for Refusal, dated Jun. 12, 2012 from the Japanese Patent Office, issued in corresponding Japanese Patent Application No. 2009-502588, along with an English translation thereof.

* cited by examiner

PNEUMATIC TIRE

TECHNICAL FIELD

This invention relates to a pneumatic tire, and more particularly to a heavy duty radial tire in which a fracture resistance is high, an appearance during a final stage of running is good and a heat buildup is low.

BACKGROUND ART

In a heavy duty tire, a tread portion commonly has a so-called "cap/base structure" comprising a cap rubber and a base rubber and uses a cap rubber being excellent in a wear resistance and a base rubber being excellent in an appearance and a low heat buildup during a final stage of running, in order to simultaneously establish the wear resistance and the appearance and the low heat buildup during the final stage of the running.

Regarding the base rubber, a rubber having a large breaking elongation and a low tensile stress (elastic modulus) is preferable in order to improve the appearance during the final stage of the running, and a rubber having a high tensile stress and capable of suppressing deformation during rotating is preferable in order to lower a heat buildup. Therefore, it is usually difficult to simultaneously establish the appearance and the low heat buildup of the base rubber during the final stage of the running.

As another method for lowering the heat buildup is mentioned a method of making a hysteresis loss of the base rubber low. For example, by increasing an amount of sulfur compounded in a rubber composition used in the base rubber, the hysteresis loss of the base rubber can be lowered, but the tensile stress becomes excessively large and thereby the appearance during the final stage of the running is deteriorated.

Also, by reducing an amount of a filler compounded in the rubber composition used in the base rubber, the hysteresis loss of the base rubber can be lowered and in this case, the breaking elongation of the base rubber can be also improved. However, when the amount of the filler compounded is excessively reduced, it is known that the base rubber is easily subjected to a cut from a road surface to cause deterioration of the appearance during the final stage of the running.

DISCLOSURE OF THE INVENTION

It is, therefore, an object of the invention to solve the above-mentioned problems of the conventional techniques and to provide a pneumatic tire in which the appearance during the final stage of the running is good and the heat buildup is low.

The inventor has made various studies in order to achieve the above objects and discovered that in a tire comprising a tread portion having a cap/base structure, the appearance of the tire during the final stage of the running can be improved and the heat buildup can be lowered by using in the base rubber a rubber composition compounded with carbon black and silica in a specified amount and limiting each of a tensile stress at 300% elongation ($M_{300}$) and a loss tangent (tan δ) of the base rubber to be within a specified range, and as a result the invention has been accomplished.

That is, the pneumatic tire according to the invention comprises a tread portion having a cap rubber and a base rubber, and is characterized in that:

a rubber composition comprising not less than 30 parts by mass of carbon black and not less than 2 parts by mass of silica based on 100 parts by mass of a rubber component is used in the base rubber;

and the base rubber has a tensile stress at 300% elongation ($M_{300}$) of 10-14 MPa and a loss tangent (tan δ) of 0.1 or lower.

In a preferable embodiment of the pneumatic tire according to the invention, the rubber component of the rubber composition used in the base rubber is natural rubber or a blend of natural rubber and polyisoprene rubber.

In another preferable embodiment of the pneumatic tire according to the invention, the rubber composition used in the base rubber further comprises 0.1-5 parts by mass of a hydrazide compound and 0.1-5 parts by mass of a compound (Z) having in its molecule at least one reactive group a for the rubber component and two or more adsorption groups b for the silica based on 100 parts by mass of the rubber component.

In the rubber composition used in the base rubber of the pneumatic tire according to the invention, the carbon black preferably has a nitrogen adsorption specific surface area ($N_2SA$) of not higher than 100 $m^2/g$ and a dibutyl phthalate (DBP) absorption number of not higher than 90 mL/100 g.

In another preferable embodiment of the pneumatic tire according to the invention, an amount of the silica compounded is 3-8 parts by mass based on 100 parts by mass of the rubber component.

In another preferable embodiment of the pneumatic tire according to the invention, the rubber composition used in the base rubber does not comprise a silane coupling agent.

In the other preferable embodiment of the pneumatic tire according to the invention, an outer surface of the base rubber in a radial direction of the tire is located more outward in a radial direction of the tire than a groove bottom of the tire.

According to the invention, there can be provided a pneumatic tire, wherein a rubber composition comprising not less than 30 parts by mass of carbon black and not less than 2 parts by mass of silica based on 100 parts by mass of a rubber component is used in the base rubber, the base rubber has a tensile stress at 300% elongation ($M_{300}$) of 10-14 MPa and a loss tangent (tan δ) of 0.1 or lower, an appearance during the final stage of the running is good and heat buildup is low.

BEST MODE FOR CARRYING OUT THE INVENTION

The invention will be described in detail below. The pneumatic tire according to the invention comprises a tread portion having a cap rubber and a base rubber, and is characterized in that a rubber composition comprising not less than 30 parts by mass of carbon black and not less than 2 parts by mass of silica based on 100 parts by mass of a rubber component is used in the base rubber, and the base rubber has a tensile stress at 300% elongation ($M_{300}$) of 10-14 MPa and a loss tangent (tan δ) of 0.1 or lower. By rendering the amount of the carbon black compounded to be not less than 30 parts by mass and further rendering the amount of the silica compounded to be not less than 2 parts by mass based on 100 parts by mass of the rubber component in the rubber composition used in the base rubber, a cut resistance of the tire can be improved to make the appearance during the final stage of the running good.

Moreover, by rendering the tensile stress at 300% elongation ($M_{300}$) of the base rubber to be not higher than 14 MPa and further rendering the loss tangent (tan δ) of the base rubber to be 0.1 or lower, a heat buildup of the tire can be lowered with improving the appearance of the tire during the final stage of the running. When the tensile stress at 300% elongation ($M_{300}$) of the base rubber exceeds 14 MPa, the appearance during the final stage of the running is not sufficiently improved. Also, when the loss tangent (tan δ) of the base rubber exceeds 0.1, the tensile stress at 300% elongation ($M_{300}$) must be higher than 14 MPa in order to lower the heat buildup sufficiently and thereby the appearance during the final stage of the running and the heat buildup cannot be balanced. Further, when the tensile stress at 300% elongation ($M_{300}$) of the base rubber is lower than 10 MPa, the heat buildup cannot be sufficiently lowered even by rendering the loss tangent (tan δ) to be 0.1 or lower. Moreover, the base rubber preferably has a tensile stress at 300% elongation ($M_{300}$) of 10-13 MPa and a loss tangent (tan δ) of 0.09 or lower, more preferably has a tensile stress at 300% elongation ($M_{300}$) of 10-12 MPa and a loss tangent (tan δ) of 0.09 or lower.

In the rubber composition for the base rubber, the carbon black preferably has a nitrogen adsorption specific surface area ($N_2SA$) of not higher than 100 m$^2$/g and a dibutyl phthalate (DBP) absorption number of not higher than 90 mL/100 g. When the $N_2SA$ of the carbon black exceeds 100 m$^2$/g, the loss tangent (tan δ) of the base rubber tends to exceed 0.1 because the amount of the carbon black compounded is not less than 30 parts by mass based on 100 parts by mass of the rubber component. Further, when the DBP absorption number exceeds 90 mL/100 g, a fatigue resistance may be deteriorated to cause the deterioration of the appearance during the final stage of the running.

In the rubber composition for the base rubber, the amount of the silica compounded is preferably within a range of 3 to 8 parts by mass based on 100 parts by mass of the rubber component. When the amount of the silica compounded is less than 3 parts by mass, the cut resistance of the base rubber tends to be degraded, while when it exceeds 8 parts by mass, the amount of the carbon black compounded must be reduced in order to render the loss tangent (tan δ) of the base rubber to be 0.1 or lower, and thereby a reinforcing property of the base rubber tends to be deteriorated and also the cut resistance tends to be deteriorated.

The rubber component used in the rubber composition for the base rubber is not particularly limited, and includes synthetic rubbers such as polybutadiene rubber (BR), polyisoprene rubber (IR), styrene-butadiene copolymer rubber (SBR) and so on, in addition to natural rubber (NR). Among them, the natural rubber is particularly preferable from the viewpoint of the excellent fracture resistance. These rubber components may be used alone or in a blend, and as the blend is preferable a blend of the natural rubber and the polyisoprene rubber. Further, as the rubber component, any of an unmodified rubber and a modified rubber may be used and a modified natural rubber is preferably used.

For example, the modified natural rubber can be produced by adding a polar group-containing monomer to a natural rubber latex to graft-polymerize the polar group-containing monomer onto a natural rubber molecule in the natural rubber latex, further coagulating and drying it. The natural rubber latex used for producing the modified natural rubber is not particularly limited and can include, for example, a field latex, an ammonia-treated latex, a centrifugally concentrated latex, a deproteinized latex treated with a surfactant or an enzyme, and a combination thereof.

The polar group-containing monomer added to the natural rubber latex has at least one polar group in its molecule and is not particularly limited as long as it can be graft-polymerized with the natural rubber molecule. The polar group-containing monomer is preferable to have a carbon-carbon double bond in its molecule for the graft-polymerization with the natural rubber molecule and is preferably a polar group-containing vinyl-based monomer. As a concrete example of the polar group are preferably mentioned amino group, imino group, nitrile group, ammonium group, imide group, amide group, hydrazo group, azo group, diazo group, hydroxyl group, carboxyl group, carbonyl group, epoxy group, oxycarbonyl group, sulfide group, disulfide group, sulfonyl group, sulfinyl group, thiocarbonyl group, nitrogen-containing heterocyclic group, oxygen-containing heterocyclic group, alkoxysilyl group, tin-containing group and so on. These polar group-containing monomers may be used alone or in a combination of two or more.

As the amino group-containing monomer are mentioned polymerizable monomers containing in their molecule at least one amino group selected from primary, secondary and tertiary amino groups. Among the polymerizable monomers having the amino group, a tertiary amino group-containing monomer such as dialkylaminoalkyl(metha)acrylate or the like is particularly preferable. These amino group-containing monomers may be used alone or in a combination of two or more. As the primary amino group-containing monomer are mentioned acrylamide, methacrylamide, 4-vinylaniline, aminomethyl(metha)acrylate, aminoethyl(metha)acrylate, aminopropyl(metha)acrylate, aminobutyl(metha)acrylate and so on. As the secondary amino group-containing monomer are mentioned (1) anilinostyrenes such as anilinostyrene, β-phenyl-p-anilinostyrene, β-cyano-p-anilinostyrene, β-cyano-β-methyl-p-anilinostyrene, β-chloro-p-anilinostyrene, β-carboxy-p-anilinostyrene, β-methoxycarbonyl-p-anilinostyrene, β-(2-hydroxyethoxy)carbonyl-p-anilinostyrene, β-formyl-p-anilinostyrene, β-formyl-β-methyl-p-anilinostyrene, α-carboxy-β-carboxy-β-phenyl-p-anilinostyrene and the like, (2) anilinophenyl butadienes such as 1-anilinophenyl-1,3-butadiene, 1-anilinophenyl-3-methyl-1,3-butadiene, 1-anilinophenyl-3-chloro-1,3-butadiene, 3-anilinophenyl-2-methyl-1,3-butadiene, 1-anilinophenyl-2-chloro-1,3-butadiene, 2-anilinophenyl-1,3-butadiene, 2-anilinophenyl-3-methyl-1,3-butadiene, 2-anilinophenyl-3-chloro-1,3-butadiene and the like, and (3) N-monosubstituted (metha)acrylamides such as N-methyl(metha)acrylamide, N-ethyl(metha)acrylamide, N-methylol acrylamide, N-(4-anilinophenyl)methacrylamide and the like. As the tertiary amino group-containing monomer are mentioned N,N-disubstituted aminoalkyl(metha)acrylate, N,N-disubstituted aminoalkyl(metha)acrylamide and so on. As the N,N-disubstituted aminoalkyl(metha)acrylate are mentioned esters of acrylic acid or methacrylic acid such as N,N-dimethylaminomethyl(metha)acrylate, N,N-dimethylaminoethyl(metha)acrylate, N,N-dimethylaminopropyl(metha)acrylate, N,N-dimethylaminobutyl(metha)acrylate, N,N-diethylaminoethyl(metha)acrylate, N,N-diethylaminopropyl(metha)acrylate, N,N-diethylaminobutyl(metha)acrylate, N-methyl-N-ethylaminoethyl(metha)acrylate, N,N-dipropylaminoethyl(metha)acrylate, N,N-dibutylaminoethyl(metha)acrylate, N,N-dibutylaminopropyl(metha)acrylate, N,N-dibutylaminobutyl(metha)acrylate, N,N-dihexylaminoethyl(metha)acrylate, N,N-dioctylaminoethyl(metha)acrylate, acryloyl morpholine and so on. Among them, N,N-dimethylaminoethyl(metha)acrylate, N,N-diethylaminoethyl(metha)acrylate, N,N-dipropylaminoethyl(metha)acrylate, N,N-dioctylaminoethyl(metha)acrylate, N-methyl-N- ethylaminoethyl(metha)acrylate and the like are particularly preferable. Also, as the N,N-disubstituted aminoalkyl(metha) acrylamide are mentioned acrylamide compounds and methacrylamide compounds such as N,N-dimethylaminomethyl (metha)acrylamide, N,N-dimethylaminoethyl(metha) acrylamide, N,N-dimethylaminopropyl(metha)acrylamide, N,N-dimethylaminobutyl(metha)acrylamide, N,N-diethylaminoethyl(metha)acrylamide, N,N-diethylaminopropyl (metha)acrylamide, N,N-diethylaminobutyl(metha)acrylamide, N-methyl-N-ethyl aminoethyl(metha)acrylamide, N,N-dipropylamino ethyl(metha)acrylamide, N,N-dibutylaminoethyl(metha)acrylamide, N,N-dibutylaminopropyl (metha)acrylamide, N,N-dibutylaminobutyl(metha)acrylamide, N,N-dihexylaminoethyl(metha)acrylamide, N,N-dihexylaminopropyl(metha)acrylamide, N,N-dioctylaminopropyl(metha)acrylamide and so on. Among them, N,N-dimethylaminopropyl(metha)acrylamide, N,N-diethylaminopropyl(metha)acrylamide, N,N-dioctylaminopropyl(metha)acrylamide and the like are particularly preferable.

As the nitrile group-containing monomer are mentioned (metha)acrylonitrile, vinylidene cyanide and so on. These nitrile group-containing monomers may be used alone or in a combination of two or more.

As the hydroxyl group-containing monomer are mentioned polymerizable monomers having in one molecule at least one hydroxyl group selected from primary, secondary and tertiary hydroxyl groups. As such a monomer are mentioned hydroxyl group-containing unsaturated carboxylic acid-based monomers, hydroxyl group-containing vinyl ether-based monomers, hydroxyl group-containing vinyl ketone-based monomers and the like. As the hydroxyl group-containing monomer are concretely mentioned hydroxyalkyl(metha) acrylates such as 2-hydroxyethyl(metha)acrylate, 2-hydroxypropyl(metha)acrylate, 3-hydroxypropyl(metha)acrylate, 2-hydroxybutyl(metha)acrylate, 3-hydroxybutyl(metha) acrylate, 4-hydroxybutyl(metha)acrylate and the like; mono (metha)acrylates of polyalkylene glycol (the number of alkylene glycol units is, for example, 2-23) such as polyethylene glycol, polypropylene glycol and the like; hydroxyl group-containing unsaturated amides such as N-hydroxymethyl (metha)acrylamide, N-(2-hydroxyethyl)(metha)acrylamide, N,N-bis(2-hydroxymethyl)(metha)acrylamide and the like; hydroxyl group-containing vinylaromatic compounds such as o-hydroxystyrene, m-hydroxystyrene, p-hydroxystyrene, o-hydroxy-α-methylstyrene, m-hydroxy-α-methylstyrene, p-hydroxy-α-methylstyrene, p-vinylbenzyl alcohol and the like. Among them, the hydroxyl group-containing unsaturated carboxylic acid-based monomers, hydroxyalkyl(metha) acrylates and hydroxyl group-containing vinylaromatic compounds are preferable, and the hydroxyl group-containing unsaturated carboxylic acid-based monomers are particularly preferable. As the hydroxyl group-containing unsaturated carboxylic acid-based monomer are mentioned derivatives such as esters, amides, anhydrides and the like of acrylic acid, methacrylic acid, itaconic acid, fumaric acid, maleic acid and the like. Among them, esters of acrylic acid, methacrylic acid and the like are particularly preferable. These hydroxyl group-containing monomers may be used alone or in a combination of two or more.

As the carboxyl group-containing monomer are mentioned unsaturated carboxylic acids such as (metha)acrylic acid, maleic acid, fumaric acid, itaconic acid, tetraconic acid, cinnamic acid and the like; free carboxyl group-containing esters such as monoesters of a non-polymerizable polyvalent carboxylic acid such as phthalic acid, succinic acid, adipic acid or the like and a hydroxyl group-containing unsaturated compound such as (metha)allyl alcohol, 2-hydroxyethyl(metha) acrylate or the like, and salts thereof. Among them, the unsaturated carboxylic acids are particularly preferable. These carboxyl group-containing monomers may be used alone or in a combination of two or more.

As the epoxy group-containing monomer are mentioned (metha)allyl glycidyl ether, glycidyl(metha)acrylate, 3,4-oxycyclohexyl(metha)acrylate and so on. These epoxy group-containing monomers may be used alone or in a combination of two or more.

As the nitrogen-containing heterocyclic ring in the monomer containing the nitrogen-containing heterocyclic group are mentioned pyrrole, histidine, imidazole, triazolidine, triazole, triazine, pyridine, pyrimidine, pyrazine, indole, quinoline, purine, phenazine, pteridine, melamine and so on. Moreover, the nitrogen-containing heterocyclic ring may include another heteroatom in its ring. A monomer containing pyridyl group as the nitrogen-containing heterocyclic group includes pyridyl group-containing vinyl compounds such as 2-vinylpyridine, 3-vinylpyridine, 4-vinylpyridine, 5-methyl-2-vinylpyridine, 5-ethyl-2-vinylpyridine and so on. Among them, 2-vinylpyridine, 4-vinylpyridine and the like are particularly preferable. These nitrogen-containing heterocyclic group-containing monomers may be used alone or in a combination of two or more.

As the alkoxysilyl group-containing monomer are mentioned (metha)acryloxymethyl trimethoxysilane, (metha) acryloxymethyl methyl dimethoxysilane, (metha)acryloxymethyl dimethyl methoxysilane, (metha) acryloxymethyl triethoxysilane, (metha)acryloxymethyl methyl diethoxysilane, (metha)acryloxymethyl dimethyl ethoxysilane, (metha)acryl oxymethyl tripropoxysilane, (metha)acryloxymethyl methyl dipropoxysilane, (metha) acryloxymethyl dimethyl propoxysilane, γ-(metha)acryloxypropyl trimethoxysilane, γ-(metha)acryloxypropyl methyl dimethoxysilane, γ-(metha)acryloxypropyl dimethyl methoxysilane, γ-(metha)acryloxypropyl triethoxysilane, γ-(metha)acryloxypropyl methyl diethoxysilane, γ-(metha) acryloxypropyl dimethyl ethoxysilane, γ-(metha)acryloxypropyl tripropoxysilane, γ-(metha)acryloxypropyl methyl dipropoxysilane, γ-(metha)acryloxypropyl dimethyl propoxysilane, γ-(metha)acryloxypropyl methyl diphenoxysilane, γ-(metha)acryloxypropyl dimethyl phenoxysilane, γ-(metha)acryloxypropyl methyl dibenzyloxysilane, γ-(metha)acryloxypropyl dimethyl benzyloxysilane, trimethoxy vinylsilane, triethoxy vinylsilane, 6-trimethoxysilyl-1,2-hexene, p-trimethoxysilyl styrene and so on. These alkoxysilyl group-containing monomers may be used alone or in a combination of two or more.

As the monomer having the tin-containing group are mentioned tin-containing monomers such as allyl tri-n-butyl tin, allyl trimethyl tin, allyl triphenyl tin, allyl tri-n-octyl tin, (metha)acryloxy-n-butyl tin, (metha)acryloxy trimethyl tin, (metha)acryloxy triphenyl tin, (metha)acryloxy-n-octyl tin, vinyl tri-n-butyl tin, vinyl trimethyl tin, vinyl triphenyl tin, vinyl tri-n-octyl tin and so on. These tin-containing monomers may be used alone or in a combination of two or more.

The graft polymerization of the polar group-containing monomer onto the natural rubber molecule can be conducted as an emulsion polymerization. In the emulsion polymerization, it is commonly preferable that a solution formed by adding water and if necessary an emulsifying agent to the natural rubber latex is added with the polar group-containing monomer and further added with a polymerization initiator, and stirred at a given temperature to polymerize the polar group-containing monomer. In the addition of the polar group-containing monomer to the natural rubber latex, the emulsifying agent may be previously added to the natural rubber latex, or the polar group-containing monomer may be emulsified with the emulsifying agent and then added to the natural rubber latex. The emulsifying agent usable in the emulsification of the natural rubber latex and/or the polar group-containing monomer is not particularly limited and includes nonionic surfactants such as polyoxyethylene lauryl ether and the like.

The polymerization initiator is not particularly limited and may include various polymerization initiators for the emulsion polymerization, and also the addition method thereof is not particularly limited. As the commonly used polymerization initiator are mentioned benzoyl peroxide, hydrogen peroxide, cumene hydroperoxide, tert-butyl hydroperoxide, di-tert-butyl peroxide, 2,2-azobisisobutyronitrile, 2,2-azobis(2-diaminopropane)hydrochloride, 2,2-azobis(2-diaminopropane)dihydrochloride, 2,2-azobis(2,4-dimethylvaleronitrile), potassium persulfate, sodium persulfate, ammonium persulfate and so on. Moreover, it is preferable to use a redox type polymerization initiator for lowering the polymerization temperature. As a reducing agent to be combined with a peroxide in the redox type polymerization initiator are mentioned, for example, tetraethylene pentamine, mercaptanes, acidic sodium sulfite, a reducing metal ion, ascorbic acid and so on. As a preferable combination of the peroxide and the reducing agent in the redox type polymerization initiator are mentioned a combination of tert-butyl hydroperoxide and tetraethylene pentamine and so on. In order to improve the low hysteresis loss and the wear resistance of the rubber composition by using the modified natural rubber without deteriorating the processability, it is important to evenly introduce a small amount of the polar group-containing monomer into each of the natural rubber molecules. Therefore, the amount of the polymerization initiator added is preferably within a range of 1-100 mol %, and more preferably 10-100 mol % based on the polar group-containing monomer.

The aforementioned components are charged into a reaction vessel and reacted at 30 to 80° C. for 10 minutes to 7 hours to obtain the modified natural rubber latex wherein the polar group-containing monomer is graft-copolymerized onto the natural rubber molecule. Further, the modified natural rubber latex is coagulated and washed, and then dried by using a drying machine such as a vacuum drier, an air drier, a drum drier or the like to obtain the modified natural rubber. The coagulating agent used for coagulating the modified natural rubber latex is not particularly limited, but includes acids such as formic acid, sulfuric acid and the like, and salts such as sodium chloride and the like.

The content of the polar group in the modified natural rubber is preferably within a range of 0.001 to 0.5 mmol/g, more preferably within a range of 0.002 to 0.3 mmol/g, and even more preferably within a range of 0.003 to 0.2 mmol/g based on the rubber component in the modified natural rubber. When the polar group content in the modified natural rubber is less than 0.001 mmol/g, the low loss factor and the wear resistance of the rubber composition may not be sufficiently improved. While, when the polar group content in the modified natural rubber exceeds 0.5 mmol/g, the physical properties inherent to the natural rubber such as viscoelasticity, S—S characteristic (stress-strain curve in the tensile testing machine) and so on are largely changed to diminish the excellent physical properties inherent to the natural rubber and also the processability of the rubber composition may be largely deteriorated.

It is preferable that the rubber composition for the base rubber further comprises 0.1-5 parts by mass of a hydrazide compound and 0.1-5 parts by mass of a compound (Z) having in its molecule at least one reactive group a for the rubber component and two or more adsorption groups b for the silica based on 100 parts by mass of the rubber component, in addition to the carbon black and the silica.

The hydrazide compound suppresses reversion of the rubber composition and thereby has the effect of lowering heat buildup of the rubber composition. When the amount of the hydrazide compound compounded is less than 0.1 part by mass, the effect of suppressing the reversion of the rubber composition and the effect of lowering the heat buildup of the rubber composition are small, while when it exceeds 5 parts by mass, a cost increases but the effects are not further improved.

As the hydrazide compound are preferable compounds represented by the following formula (I):

[wherein Y is an arylene group, a divalent hydantoin residue or a saturated or unsaturated divalent chain hydrocarbon group having a carbon number of 1-18; X is a hydrogen atom, a hydroxyl group, an amino group or a group represented by the following formula (II):

; and $R^1$-$R^4$ are independently a hydrogen atom or a hydrocarbyl group having a carbon number of 1-18, provided that $R^1$ and $R^2$ and/or $R^3$ and $R^4$ may be bonded to each other to form a ring structure].

The arylene group as Y in the formula (I) includes a divalent aromatic heterocyclic group. As the arylene group, phenylene group and naphthylene group are preferable and these groups may have suitable substituents such as lower alkyl groups and lower alkoxyl groups on the ring. Further, the divalent hydantoin residue may have suitable substituents such as lower alkyl groups and lower alkoxyl groups on the ring. As the saturated or unsaturated divalent chain hydrocarbon group having a carbon number of 1-18 are mentioned alkylene groups having a carbon number of 1-18 and alkenylene groups having a carbon number of 2-18. These groups may be linear or branched. As the alkylene group and the alkenylene group are mentioned methylene group, ethylene group, propylene group, butylene group, hexylene group, octylene group, decylene group, vinylene group, allylene group, propenylene group, butenylene group, hexenylene group, octenylene group, decenylene group and so on.

As the hydrocarbyl group having a carbon number of 1-18 as $R^1$-$R^4$ in the formulae (I) and (II) are mentioned linear or branched alkyl groups having a carbon number of 1-18, linear or branched alkenyl groups having a carbon number of 2-18, cycloalkyl groups having a carbon number of 3-18, aryl groups having a carbon number of 6-18 and aralkyl groups having a carbon number of 7-18. The cycloalkyl groups, the aryl groups and the aralkyl groups may have suitable substituents such as lower alkyl groups, lower alkoxyl groups, amino group, alkyl-substituted amino groups and hydroxyl group on the ring. As the alkyl group are mentioned methyl group, ethyl group, n-propyl group, isopropyl group, n-butyl group, isobutyl group, sec-butyl group, tert-butyl group, pentyl group, hexyl group, octyl group, decyl group and so on. As the alkenyl group are mentioned vinyl group, allyl group, propenyl group, butenyl group, hexenyl group, octenyl group, decenyl group and so on. As the cycloalkyl group are mentioned cyclopentyl group, cyclohexyl group, methylcyclohexyl group and so on. As the aryl group are mentioned phenyl group, tolyl group, xylyl group, naphthyl group, methylnaphthyl group and so on. As the aralkyl group are mentioned benzyl group, phenetyl group, naphthylmethyl group and so on.

Among the compounds represented by the formula (I), compounds wherein Y is the arylene group and X is the hydroxyl group are preferable, and compounds represented by the following formula (III):

(III)

[wherein each of $R^1$ and $R^2$ is the same meaning as mentioned above] and compounds represented by the following formula (IV):

(IV)

[wherein each of $R^1$ and $R^2$ is the same meaning as mentioned above] are particularly preferable.

As the compound represented by the formula (III) are concretely mentioned 3-hydroxy-N'-(1-methylethylidene)-2-naphthoic acid hydrazide, 3-hydroxy-N'-(1-methylpropylidene)-2-naphthoic acid hydrazide, 3-hydroxy-N'-(1-methylbutylidene)-2-naphthoic acid hydrazide, 3-hydroxy-N'-(1,3-dimethylbutylidene)-2-naphthoic acid hydrazide, 3-hydroxy-N'-(2,6-dimethyl-4-heptylidene)-2-naphthoic acid hydrazide, 3-hydroxy-N'-(1,2-diphenylethylidene)-2-naphthoic acid hydrazide and so on. As the compound represented by the formula (IV) are concretely mentioned N'-(1-methylethylidene)-salicylic acid hydrazide, N'-(1-methylpropylidene)-salicylic acid hydrazide, N'-(1-methylbutylidene)-salicylic acid hydrazide, N'-(1,3-dimethylbutylidene)-salicylic acid hydrazide, N'-(2,6-dimethyl-4-heptylidene)-salicylic acid hydrazide and so on. Among these hydrazide compounds, 3-hydroxy-N'-(1,3-dimethylbutylidene)-2-naphthoic acid hydrazide is particularly preferable. These hydrazide compounds can be synthesized by heating to react the starting 3-hydroxy-2-naphthoic acid hydrazide or the like with acetone, methyl isobutyl ketone or the like.

On the other hand, the compound (Z) having in its molecule at least one reactive group a for the rubber component and two or more adsorption groups b for the silica has the effect of highly elasticizing the rubber composition. When the amount of the compound (Z) compounded is less than 0.1 part by mass based on 100 parts by mass of the rubber component, the elasticity of the rubber composition cannot be sufficiently improved, while when it exceeds 5 parts by mass, the elasticity of the rubber composition is not further improved to bring about the increase of the cost.

In the compound (Z), the reactive group a for the rubber component is preferable to be a group which has a double bond and to which a group activating the double bond is adjacent, and particularly preferable to be a non-aromatic conjugated double bond group or a double bond group to which a group selected from a carbonyl group, a carboxyl group, an oxycarbonyl group and an amide group is adjacent. The term "adjacent" herein means to have a group selected from a carbonyl group, a carboxyl group, an oxycarbonyl group and an amide group at both ends or one end of the double bond.

In the compound (Z), the reactive group a is preferably a group derived from an unsaturated carboxylic acid selected from maleic acid, fumaric acid, itaconic acid, acrylic acid, methacrylic acid and sorbic acid, more preferably a group derived from maleic acid, fumaric acid, itaconic acid and acrylic acid, and most preferably a group derived from maleic acid and acrylic acid. On the other hand, the adsorption group b is preferably a carboxyl group.

Moreover, the compound (Z) is preferable to further have an oxyalkylene group. When the compound (Z) has the oxyalkylene group, the compatibility with the rubber component is further improved and the affinity with the silica is further improved. An average addition mole number of the oxyalkylene group is within a range of preferably 1 to 30 mol, more preferably 1 to 20 mol and particularly preferably 2 to 15 mol per the reactive group a for the rubber component.

As the compound (Z) are concretely mentioned mono(metha)acryloyloxyalkyl esters of polycarboxylic acids such as trimellitic acid, pyromellitic acid, citric acid and so on (in this context, (metha)acryloyl represents methacryloyl or acryloyl); (poly)esters of unsaturated carboxylic acids with oxycarboxylic acids, such as monomalic acid maleate and so on; esters, which have carboxylic acids at both ends, of diols such as ethylene glycol, hexanediol and cyclohexanedimethanol with unsaturated dicarboxylic acids such as maleic acid, fumaric acid and itaconic acid; N-(carboxyalkyl) maleamic acid such as N-(2-carboxyethyl)maleamic acid; and a compound represented by the following formula (V), (VI) or (VII).

(V)

In the formula (V), $R^5$ is a group represented by the formula of —$R^6$O—, a group represented by the formula of —($R^7$O)$_s$—, a group represented by the formula of —CH$_2$CH(OH)CH$_2$O— or a group represented by the formula of —($R^8$O—COR$^9$—COO—)$_t$R$^8$O—. In this case, $R^6$ is an alkylene group or an alkenylene group having a carbon number of 2 to 36 or a bivalent aromatic hydrocarbon group, preferably an alkylene group having a carbon number of 2 to 18 or phenylene group, and more preferably an alkylene group having a carbon number of 4 to 12. Also, $R^7$ is an alkylene group having a carbon number of 2 to 4, preferably ethylene group or propylene group, and s is a number of 1 to 60, preferably 2 to 40, more preferably 4 to 30 showing an average mole number of an added oxyalkylene group. $R^8$ is an alkylene group or an alkenylene group having a carbon number of 2 to 18, a bivalent aromatic hydrocarbon group or a group represented by the formula of —($R^{10}$O)$_u$R$^{10}$— (wherein $R^{10}$ is an alkylene group having a carbon number of 2 to 4; and u is a number of 1 to 30 showing an average mole number of an added oxyalkylene group). $R^9$ is an alkylene group or an alkenylene group having a carbon number of 2 to 18 or a bivalent aromatic hydrocarbon group, preferably an alkylene group having a carbon number of 2 to 12 or phenylene group, and more preferably an alkylene group having a carbon number of 2 to 8. Also, t is a number of 1 to 30, preferably 1 to 20, and more preferably 1 to 15 as an average value.

As the compound represented by the formula (V) are concretely mentioned dimaleates of alkylenediols such as glycerin dimaleate, 1,4-butanediol dimaleate, 1,6-hexanediol dimaleate and the like; difumarates of alkylenediols such as 1,6-hexanediol difumarate and the like; dimaleates of polyoxyalkylene glycols such as PEG 200 dimaleate, PEG 600 dimaleate and the like (wherein each of PEG 200 and PEG 600 represents polyethylene glycol having an average molecular weight of 200 or 600); both terminal-carboxylic acid type polyalkylene glycol/maleic acid polyesters such as polybutylene maleate having carboxyl groups at both terminals, poly(PEG 200) maleate having carboxyl groups at both terminals and the like; polybutylene adipate maleate having carboxyl groups at both terminals, difumarates of polyoxyalkylene glycols such as PEG 600 difumarate and the like; and both terminal-carboxylic acid type polyalkylene glycol/fumaric acid polyesters such as polybutylene fumarate having carboxyl groups at both terminals, poly(PEG 200) fumarate having carboxyl groups at both terminals and the like.

(VI)

In the formula (VI), one of $R^{11}$, $R^{12}$ and $R^{13}$ is a group represented by the formula of $-(R^{14}O)_n-CO-CR^{15}=CR^{16}-R^{17}$, and the others are hydrogen atoms. In this context, $R^{14}$ is an alkylene group having a carbon number of 2-4, preferably ethylene group or propylene group. Further, $R^{15}$, $R^{16}$ and $R^{17}$ are independently a hydrogen atom or methyl group; preferably, $R^{15}$ is a hydrogen atom or methyl group, and $R^{16}$ and $R^{17}$ are hydrogen atoms. The n is a number of 1 to 30, preferably 1 to 20 and more preferably 2 to 15 showing an average mole number of an added oxyalkylene group.

As the compound represented by the formula (VI) are concretely mentioned mono(ω)-(metha)acryloyloxy POA(n)) trimellitate (wherein (metha)acryloyl represents methacryloyl or acryloyl, and POA(n) represents polyoxyethylene (hereinafter abbreviated as "POE") or polyoxypropylene (hereinafter abbreviated as "POP") in which 1 to 30 moles of oxyethylene or oxypropylene is added on an average) such as mono(2-(metha)acryloyloxyethyl)trimellitate, mono[2-(2-(metha)acryloyloxyethoxy)ethyl]trimellitate, mono(ω-(metha)acryloyloxy polyoxyethylene(10)) trimellitate and so on.

In the formula (VII), $R^{18}$, $R^{19}$ and $R^{20}$ are independently an alkylene group having a carbon number of 2 to 4, preferably ethylene group or propylene group, each of m1, m2 and m3 is a number showing an average mole number of an added oxyalkylene group, and m1+m2+m3 is 0 to 90, preferably 3 to 60 and more preferably 6 to 45.

As the compound represented by the formula (VII) are concretely mentioned POA(m) glycerin trimaleate (wherein POA(m) represents polyoxyethylene or polyoxypropylene in which 0 to 90 mole of oxyethylene or oxypropylene is added on an average) such as POE(8) glycerin trimaleate, POE(3) glycerin trimaleate, POP(10) glycerin trimaleate and so on.

Among these compounds (Z), partial esters of polybasic acids are preferable, and the compounds represented by the formula (V) are more preferable. Moreover, the compound represented by the formula (V) wherein $R^5$ is the group represented by the formula of $-(R^8O-COR^9-COO-)_t$ $R^8O-$ is even more preferable, and the compound wherein R is butylene group, $R^9$ is vinylene group, and t is 4 [HOOC—CH=CH—CO—(OC$_4$H$_8$O—CO—CH=CH—CO)$_5$—OH] is particularly preferable. Furthermore, the compound (Z) has a molecular weight of preferably not lower than 250, more preferably 250 to 5000, and particularly preferably 250 to 3000. When the molecular weight is within the range, it has a high flash point and is preferable from a viewpoint of safety, and further it has less smoke and is preferable from a viewpoint of work environment. The compounds (Z) may be used alone or in a combination of two or more.

Preferably, the rubber composition for the base rubber does not comprise a silane coupling agent. When the silane coupling agent is compounded into the rubber composition for the base rubber, the tensile stress at 300% elongation ($M_{300}$) of the base rubber becomes high and the appearance during the final stage of the running tends to be degraded.

Into the rubber composition for the base rubber can be properly compounded additives usually used in the rubber industry such as an antioxidant, a vulcanizing agent, a vulcanization accelerator and the like in addition to the above rubber component, the carbon black, the silica, the hydrazide compound and the compound (Z) in accordance with the use purpose. As these additives can be preferably used commercially available ones. The rubber composition for the base rubber can be produced by compounding the rubber component with the carbon black and the silica, and, if necessary, the properly selected additives and milling, warming, extruding and so on.

Then, the pneumatic tire according to the invention will be described in detail with reference to the attached drawing. The tire shown in FIG. 1 comprises a pair of bead portions 1, a pair of side portions 2, a tread portion 3, a radial carcass 5 toroidally extending between bead cores 4 embedded in the bead portions 1 respectively, and a belt 6 composed of plural belt layers disposed on an outside of a crown portion of the radial carcass 5 in the radial direction of the tire, wherein the tread portion 3 has a base rubber 7 disposed on an outside of the belt 6 in the radial direction of the tire and a cap rubber 8 disposed on an outside of the base rubber 7 in the radial direction of the tire, i.e., has a so-called "cap/base structure".

Figure 1:
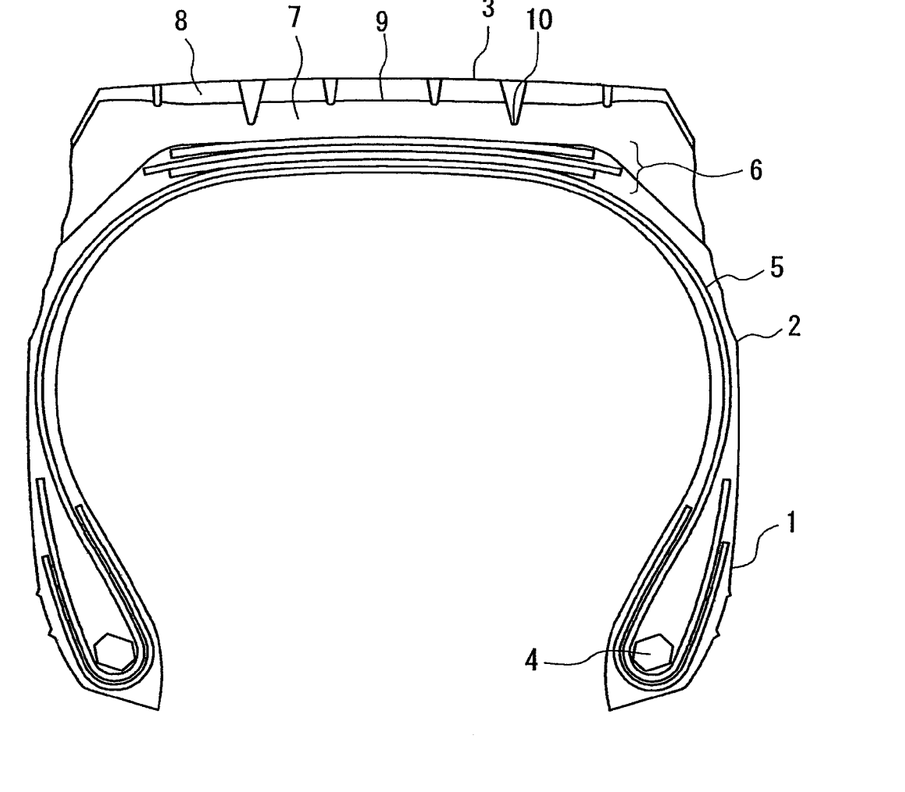
FIG. 1 is a sectional view of an embodiment of the pneumatic tire according to the invention.

In the base rubber 7 of the illustrated pneumatic tire, the above-mentioned rubber composition comprising not less than 30 parts by mass of the carbon black and not less than 2 parts by mass of the silica based on 100 parts by mass of the rubber component is used, and the base rubber 7 has a tensile stress at 300% elongation ($M_{300}$) of 10-14 MPa and a loss tangent (tan δ) of not higher than 0.1, in which the appearance during the final stage of the running is good and the heat buildup is sufficiently reduced. In this context, the other members except the base rubber 7 of the pneumatic tire according to the invention is not particularly limited, and known members can be used. Moreover, as a gas filled into the pneumatic tire of the invention can be used usual air or air having a regulated partial oxygen pressure but also inert gases such as nitrogen, argon, helium and so on.

In the pneumatic tire according to the invention, an outer surface 9 of the base rubber 7 in a radial direction of the tire (i.e., an interface between the based rubber 7 and the cap rubber 8) is preferably located more outward in a radial direction of the tire than a groove bottom 10 of the tire. Since the base rubber 7 is good in the appearance during the final stage of the running and low in the heat buildup, these effects are notably expressed when the outer surface 9 of the base rubber 7 in a radial direction of the tire is located more outward than the groove bottom 10 of the tire in a radial direction of the tire. Moreover, the pneumatic tire of the invention is preferable as a heavy duty tire.

EXAMPLES

The following examples are given in illustration of the invention and are not intended as limitations thereof.

A rubber composition having a formulation as shown in Tables 1 and 2 is prepared according to a usual method, and a heavy duty pneumatic tire having a structure shown in FIG. 1, a tire size of 11R22.5 and a block pattern is prepared by using the rubber composition in the base rubber. The resulting tire is sliced and the base rubber is taken out therefrom to prepare a JIS No. 3 test specimen according to the predetermined method, and a tensile stress at 300% elongation ($M_{300}$) thereof is measured by conducting a tensile test according to JIS K 6251. Further, a loss tangent (tan δ) is measured by using a spectrometer manufactured by Toyo Seiki Corporation under a condition that a strain is 1%, a frequency is 52 Hz and a temperature is 100° C. Furthermore, a temperature during the running and a fracture resistance are evaluated according to the following methods. Results are shown in Tables 1 and 2.

(1) Temperature During the Running

The test tire is run on a drum under a condition that a load is normal and a speed is 60 km/h, a temperature near the edge of the belt on this occasion is measured by a thermocouple, and a temperature difference is determined based on a temperature near the edge of the belt in the tire of Example 1. The minus side indicates that the temperature near the edge of the belt during the running is low and the low heat buildup is excellent.

(2) Fracture Resistance

The test tire is mounted onto a drive shaft of a truck and is run in practice for 50000 km. Then, the tire is collected and the number of the chippings in the tire is visually counted. The smaller the number, the more excellent the fracture resistance.

TABLE 1

| | | | Example 1 | Example 2 | Example 3 | Example 4 | Example 5 | Example 6 | Example 7 |
|---|---|---|---|---|---|---|---|---|---|
| Formulation summary | Natural rubber | parts by mass | 100 | 100 | 100 | 100 | 0 | 0 | 0 |
| | Modified natural rubber *1 | | 0 | 0 | 0 | 0 | 100 | 100 | 100 |
| | Carbon black (N326) *2 | | 40 | 30 | 30 | 0 | 40 | 30 | 43 |
| | Carbon black (N330) *3 | | 0 | 0 | 0 | 30 | 0 | 0 | 0 |
| | Silica *4 | | 5 | 8 | 8 | 5 | 5 | 8 | 8 |
| | Stearic acid | | 3 | 3 | 3 | 3 | 3 | 3 | 3 |
| | Zinc white | | 5 | 5 | 5 | 5 | 5 | 5 | 5 |
| | Antioxidant 6C *5 | | 1 | 1 | 1 | 1 | 1 | 1 | 1 |
| | BM56 *6 | | 3 | 3 | 1 | 1 | 3 | 3 | 3 |
| | BMH *7 | | 1.5 | 1.5 | 1.5 | 1.5 | 1.5 | 1.5 | 1.5 |
| | PK900 *8 | | 1 | 1 | 1 | 1 | 1 | 1 | 1 |
| | Vulcanization accelerator CBS *9 | | 1 | 1 | 1 | 1 | 1 | 1 | 1 |
| | Sulfur | | 1.5 | 1.5 | 1.5 | 1.5 | 1.5 | 1.5 | 1.5 |
| Properties | M300 | MPa | 13 | 12 | 12.5 | 13.8 | 11.1 | 10.2 | 10.7 |
| | tan δ | — | 0.095 | 0.085 | 0.09 | 0.095 | 0.081 | 0.072 | 0.092 |
| Performance | Temperature during the running | ° C. | standard | −2 | −3 | 0 | −3 | −4 | −2 |
| | Fracture resistance (the number of the chippings) | number | 3 | 2 | 4 | 11 | 1 | 0 | 4 |

TABLE 2

| | | | Comparative Example 1 | Comparative Example 2 | Comparative Example 3 | Comparative Example 4 | Comparative Example 5 |
|---|---|---|---|---|---|---|---|
| Formulation summary | Natural rubber | patrs by mass | 100 | 100 | 100 | 100 | 100 |
| | Modified natural rubber *1 | | 0 | 0 | 0 | 0 | 0 |
| | Carbon black (N326) *2 | | 40 | 40 | 0 | 30 | 30 |
| | Carbon black (N330) *3 | | 0 | 0 | 30 | 0 | 0 |
| | Silica *4 | | 5 | 5 | 5 | 8 | 8 |
| | Stearic acid | | 3 | 3 | 3 | 3 | 3 |
| | Zinc white | | 5 | 5 | 5 | 5 | 5 |
| | Antioxidant 6C *5 | | 1 | 1 | 1 | 1 | 1 |
| | BM56 *6 | | 0 | 1 | 1 | 0 | 0 |

TABLE 2-continued

|  |  |  | Comparative Example 1 | Comparative Example 2 | Comparative Example 3 | Comparative Example 4 | Comparative Example 5 |
|---|---|---|---|---|---|---|---|
|  | BMH *7 |  | 1.5 | 0 | 0 | 1.5 | 1.5 |
|  | PK900 *8 |  | 1 | 1 | 1 | 1 | 1 |
|  | Vulcanization accelerator CBS *9 |  | 1 | 1 | 1 | 0.8 | 0.6 |
|  | Sulfur |  | 1.5 | 1.5 | 1.5 | 1.2 | 1 |
| Properties | M300 | MPa | 13 | 14 | 15.5 | 12 | 10.3 |
|  | tan δ | — | 0.12 | 0.11 | 0.095 | 0.124 | 0.132 |
| Performance | Temperature during the running | °C. | +5 | +4 | +3 | +5 | +7 |
|  | Fracture resistance (the number of the chippings) | number | 2 | 6 | 17 | 3 | 1 |

*1 The modified natural rubber synthesized according to the following method is used.
*2 DBP absorption number = 72 mL/100 g, $N_2SA$ = 78 $m^2/g$
*3 DBP absorption number = 102 mL/100 g, $N_2SA$ = 79 $m^2/g$
*4 Nippon Silica Industrial Co., Ltd., Nipsil AQ
*5 N-(1,3-dimethylbutyl)-N'-phenyl-p-phenylenediamine
*6 Butylene glycol polymaleate, a compound of the formula (V) wherein $R^5$ is the group represented by —$(R^8O$—$COR^9$—$COO$—$)_tR^8O$—, $R^8$ is butylene group, $R^9$ is vinylene group, and t is 4 [HOOC—CH=CH—CO—$(OC_4H_8O$—CO—CH=CH—$CO)_5$—OH]
*7 3-hydroxy-N'-(1,3-dimethylbutylidene)-2-naphthoic acid hydrazide
*8 1,3-bis(citraconimidemethyl)benzene, manufactured by FLEXSYS, trade name: "PERKALINK 900"
*9 N-cyclohexyl-2-benzothiazyl sulfenamide <Production Example of Modified Natural Rubber>

A field latex is subjected to a centrifugal separation with a latex separator [made by Saito Separator Limited] at a revolution speed of 7500 rpm to obtain a concentrated latex having a dry rubber concentration of 60%. 1000 g of the concentrated latex is charged into a stainless reaction vessel provided with a stirrer and a temperature-regulating jacket, and an emulsion previously formed by adding 10 mL of water and 90 mg of an emulsifying agent [Emulgen 1108, made by Kao Corporation] to 3.0 g of N,N-diethylaminoethyl methacrylate is added together with 990 mL of water, and then stirred for 30 minutes at normal temperature while substituting with nitrogen. Then, 1.2 g of tert-butyl hydroperoxide and 1.2 g of tetraethylene pentamine are added as a polymerization initiator to conduct reaction at 40° C. for 30 minutes, whereby a modified natural rubber latex is obtained. The modified natural rubber latex is coagulated by adding formic acid to adjust pH to 4.7. The thus obtained solid is treated with a clapper 5 times, crumbed through a shredder and dried by a hot air drier at 110° C. for 210 minutes to obtain a modified natural rubber. It is confirmed from a mass of the thus obtained modified natural rubber that the conversion of N,N-diethylaminoethyl methacrylate added as a monomer is 100%. Also, the separation of a homopolymer is tried by extracting the modified natural rubber with a petroleum ether and further extracting with a 2:1 mixed solvent of acetone and methanol, but the homopolymer is not detected from the analysis of the extract, so that it is confirmed that 100% of the monomer added is introduced into the natural rubber molecule. Therefore, the polar group content in the resulting modified natural rubber is 0.027 mmol/g based on the rubber component in the natural rubber latex.

As seen from Table 1, the tires of the Examples comprising the base rubber having a tensile stress at 300% elongation ($M_{300}$) of 10-14 MPa and a loss tangent (tan δ) of 0.1 or lower have a sufficiently reduced heat buildup, a good fracture resistance (i.e., the number of the chippings is small), and a good appearance even during the final stage of the running.

To the contrary, the tires of the Comparative Examples 1, 2, 4 and 5 comprising the base rubber having a loss tangent (tan δ) of higher than 0.1 have a high heat buildup. Further, the tire of the Comparative Example 3 comprising the base rubber having a tensile stress at 300% elongation ($M_{300}$) of higher than 14 MPa has a high heat buildup, in which the number of the chippings is large and the appearance during the final stage of the running is bad.

The invention claimed is:

1. A pneumatic tire comprising a tread portion having a cap rubber and a base rubber, characterized in that:
    a rubber composition comprising not less than 30 parts by mass of carbon black and not less than 2 parts by mass of silica based on 100 parts by mass of a rubber component but not comprising a silane coupling agent is used in the base rubber,
    the rubber composition used in the base rubber further comprises 0.1-5 parts by mass of a hydrazide compound and 0.1-5 parts by mass of a compound (Z) having in its molecule at least one reactive group a for the rubber component and two or more adsorption groups b for the silica based on 100 parts by mass of the rubber component,
    the base rubber has a tensile stress at 300% elongation ($M_{300}$) of 10-14 MPa and a loss tangent (tan δ) of 0.1 or lower, and
    the carbon black has a nitrogen adsorption specific surface area ($N_2SA$) of not higher than 100 $m^2/g$ and a dibutyl phthalate (DBP) absorption number of not higher than 90 mL/100 g.

2. A pneumatic tire according to claim 1, characterized in that the rubber component of the rubber composition used in the base rubber is natural rubber or a blend of natural rubber and polyisoprene rubber.

3. A pneumatic tire according to claim 1, characterized in that an amount of the silica compounded is 3-8 parts by mass based on 100 parts by mass of the rubber component.

4. A pneumatic tire according to claim 1, characterized in that an outer surface of the base rubber in a radial direction of the tire is located more outward in a radial direction of the tire than a groove bottom of the tire.

5. A pneumatic tire according to claim 1, wherein the rubber composition comprises a modified natural rubber.

6. A pneumatic tire according to claim 5, wherein the modified natural rubber is produced by adding a polar group-containing monomer to a natural rubber latex to graft polymerize the polar group-containing onto a natural rubber molecule in the natural rubber latex.

7. A pneumatic tire according to claim 6, wherein the content of the polar group in the modified natural rubber is within a range of 0.001 to 0.5 mmol/g based on the rubber component in the modified natural rubber.

* * * * *